United States Patent [19]

Moroto et al.

[11] 4,444,073

[45] Apr. 24, 1984

[54] TORQUE TRANSFER MECHANISM WITH HYDRAULIC CONTROL SYSTEM FOR A FOUR WHEEL DRIVE VEHICLE

[75] Inventors: Shuzo Moroto, Handa; Yoichi Hayakawa, Toyoake, both of Japan

[73] Assignee: Aisin Warner Kabushiki Kaisha, Aichi, Japan

[21] Appl. No.: 249,278

[22] Filed: Mar. 30, 1981

[30] Foreign Application Priority Data

Mar. 31, 1980 [JP] Japan .................. 55-41456

[51] Int. Cl.³ .............. F16H 37/06; F16H 37/00; B60K 41/08; F01N 7/18
[52] U.S. Cl. .................. 74/665 G; 74/740; 74/869; 180/247; 192/104 F
[58] Field of Search ............ 74/740, 752 C, 867, 74/868, 869, 665 F, 665 G, 665 GA, 665 T, 674, 781 R; 180/247, 233; 137/47; 192/104 F

[56] References Cited

U.S. PATENT DOCUMENTS

| | | | |
|---|---|---|---|
| 2,988,951 | 6/1961 | Mair et al. | 74/869 X |
| 3,484,009 | 12/1969 | Barbee et al. | 180/233 |
| 3,625,322 | 12/1971 | Nagamatsu | 192/104 F |
| 3,627,072 | 12/1971 | Smirl | 180/249 |
| 3,963,085 | 6/1976 | Vinton | 180/247 |
| 4,139,015 | 2/1979 | Sakai | 74/867 |

FOREIGN PATENT DOCUMENTS 55-39871 3/1980 Japan .................. 180/247

*Primary Examiner*—Allan D. Hermann
*Assistant Examiner*—Bruce Wojciechowski
*Attorney, Agent, or Firm*—Blum, Kaplan, Friedman, Silberman and Beran

[57] ABSTRACT

A four wheel drive torque transfer mechanism with a hydraulic control system is switchable between two wheel drive and four wheel drive during running of a vehicle having an automatic transmission.

When a two wheel drive mode of operation is selected, the hydraulic control system automatically actuates the torque transfer mechanism to provide a four wheel drive operation if a governor output responsive to vehicle speed, falls below a predetermined level, and to provide a two wheel drive operation if a governor output exceeds the predetermined level.

11 Claims, 3 Drawing Figures

TORQUE TRANSFER MECHANISM WITH HYDRAULIC CONTROL SYSTEM FOR A FOUR WHEEL DRIVE VEHICLE

BACKGROUND OF THE INVENTION

This invention relates generally to a torque transfer mechanism for vehicles with an automatic transmission and more particularly, to a torque transfer mechanism for vehicles having the option of a two or a four wheel drive. Four wheel drive vehicles are becoming more popular in both large and small vehicles. These vehicles generally provide for the option of either two or four wheel drive. However, the torque transfer devices associated with these vehicles are complex, do not operate smoothly, and component wear is high.

What is needed is a torque transfer mechanism for a four wheel drive vehicle which is simple in construction, smooth in operation and has a long operating life. The ability to shift between two and four wheel drive and to switch to a speed reduction gearing ratio while the vehicle is in motion is also desirable.

SUMMARY OF THE INVENTION

Generally speaking, in accordance with the invention, a torque transfer mechanism especially suitable for a four wheel drive vehicle is provided. The transfer mechanism is mounted on a vehicle with an automatic transmission and includes a reducer which provides for both a direct coupling and a speed reduction gearing ratio. The transfer mechanism also allows for switching between two wheel and four wheel drive during running operation of the vehicle. This has been difficult to accomplish in prior art four wheel drive transfer systems.

The torque transfer mechanism includes an input shaft for receiving torque from an automatic gear transmission, a first output shaft coupled with one of the front and rear drive axles, a second output shaft coupled with the other one of the drive axles, a mechanism for transmitting the rotation of said first output shaft to the second output shaft, and an engaging means for directly connecting and disconnecting said first output shaft to and from said second output shaft.

The hydraulic control system comprises a first conduit for supplying a line pressure, generated by a hydraulic control system of the automatic transmission, to said engaging means, a valve means for selectively connecting said first conduit with said engaging means. The hydraulic control system also comprises a second conduit for supplying a governor pressure, generated by the hydraulic control system, for operating said valve means to connect said first conduit with said engaging means when said governor pressure falls below a predetermined level. When said governor pressure exceeds the predetermined level, said valve means operate to connect the first conduit to a drain means which drains pressurized fluid from said engaging means.

Accordingly, it is an object of the present invention to provide an improved torque transfer mechanism for a four wheel drive vehicle which is switchable between two wheel drive and four wheel drive during running of the vehicle.

Another object of the present invention is to provide an improved torque transfer mechanism for a four wheel drive vehicle which is hydraulically and automatically switched from two wheel drive to four wheel drive when vehicle speed falls below a selected value and from four wheel drive to two wheel drive when vehicle speed exceeds the selected value.

Yet another object of the present invention is to provide an improved torque transfer mechanism for a four wheel drive vehicle which is hydraulically and automatically switched from two wheel drive to four wheel drive when throttle pressure generated in the hydraulic control system of the automatic transmission becomes greater than the governor pressure.

A further object of the present invention is to provide an improved torque transfer mechanism for a four wheel drive vehicle which is shiftable to direct coupling drive and to driving at a speed-reduced gear ratio.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
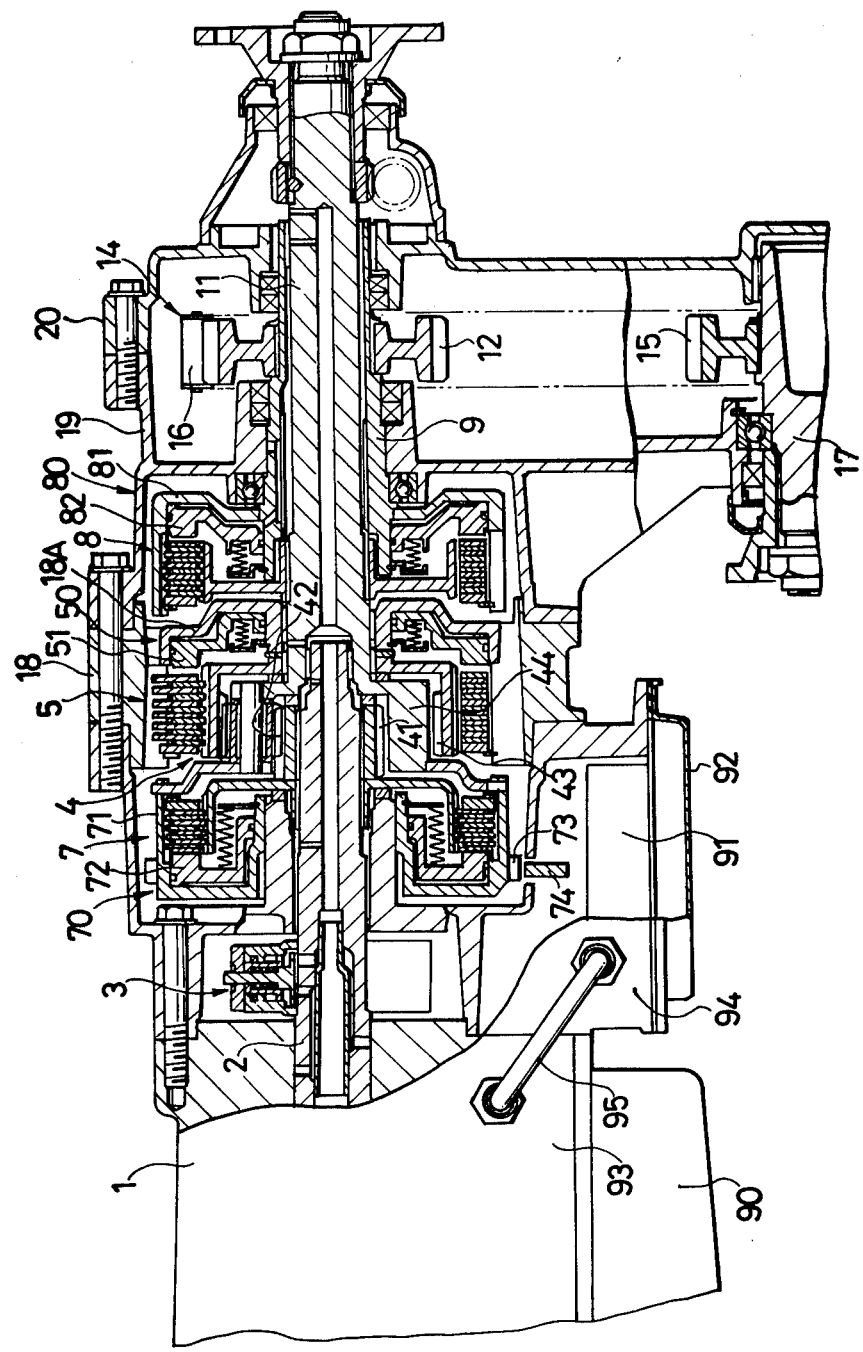
FIG. 1 is a schematic sectional view of a transfer mechanism in accordance with this invention.

Referring to FIG. 1, there is shown a four wheel drive torque transfer mechanism according to the present invention. The transfer mechanism is connected to an automatic gear transmission assembly 1 and includes an input shaft 2 which is also the output shaft of the gear mechanism of the automatic gear transmission assembly 1. Also, included in the transfer mechanism is a governor valve 3 fixedly mounted on the input shaft 2; a planetary gear set 4 having a sun gear 41 splined on the input shaft 2, a pinion 42 meshed with the sun gear 41, a ring gear 43 meshed with the pinion 42 and a carrier 44 rotatably supporting the pinion 42 and coupled with one output shaft 11 of the torque transfer mechanism. The transfer mechanism also includes: a friction brake 5 for engaging the ring gear 43 with a transfer device casing 1; a hydraulic servo motor 50 for the friction brake 5 comprised of a cylinder 18A formed in the transfer device casing 18 and a piston 51 slidably fitted in the cylinder 18A; a friction clutch 7 operated by a hydraulic servo motor 70 comprising an annular cylinder 71 connected to the carrier 44 and a piston 72 slidably fitted in the cylinder 71, for coupling and uncoupling the sun gear 41 and the carrier 44. The transfer mechanism further includes a friction clutch 8 for coupling the output shaft 11, connected to the carrier 44, with a sleeve 9 connected to one of the sprockets 12 of a linkage mechanism which drives the other output shaft 17 of the transfer mechanism as will be described hereinafter. Also, included in the transfer mechanism are a hydraulic servo motor 80 comprising a cylinder 81 welded to the sleeve 9, which is rotatably retained in the transfer casings 19, 20 and a piston 82 slidably fitted in the cylinder 81; an other output shaft 17 of the transfer mechanism; and a link mechanism 14 comprised of the sprocket 12 splined on the sleeve 9, a sprocket 15 splined on the output shaft 17 and a chain 16 passed around the sprockets 12 and 15.

The annular hydraulic cylinder 71 of the friction clutch 7 is formed with a circumferential parking gear 73 which is engageable with a parking lock pawl 74 when the shift lever of the automatic transmission is switched to parking position, thereby locking the output shaft 11.

FIG. 1 also shows an oil pan 90 of the automatic transmission, a hydraulic control system (valve casing) 91 which controls pressurized fluid flows to and from the hydraulic servo motors 70, 80, 50 of the clutches 7, 8 and brake 5 respectively of the four wheel drive torque transfer device, and an oil pan 92 for the hydraulic control system 91. The pressurized working fluid is supplied from the oil pan 90 to the hydraulic servo motors 70, 80, 50 of the clutches 7, 8 and the brake 5 by the operation of the hydraulic control system 91 through a pipe 95 which is mounted on a casing 93 of the automatic gear transmission 1 and a transfer casing 94.

Figure 2:
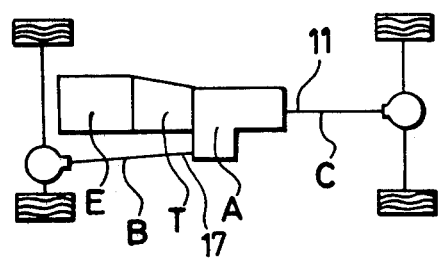
FIG. 2 is a diagram of a power transmission system of a vehicle using the transfer mechanism of FIG. 1.

As shown at A of FIG. 2, the transfer device is attached to an automatic transmission T of a vehicle engine E and has one of its output shafts 11 coupled with a rear propeller shaft C and the other output shaft 17 coupled with a front propeller shaft B.

In a normal operating condition, the line pressure which is supplied from the hydraulic control system of the automatic transmission is fed to the servo motor 70 to engage the clutch 7, while draining the servo motors 50, 80 to release the brake 5 and clutch 8 respectively. As a result, the sun gear 41 and carrier 44 of the planetary gear set 4 are connected with each other and rotate together to transfer power from the input shaft 2 to the rear drive output shaft 11 at a reduction ratio of 1 to effect direct rear two wheel drive. In this instance, the power from the input shaft 2 is transmitted to the output shaft 11 through the clutch 7 and carrier 44, bypassing the gears 41, 42, 43 to relieve their tooth faces of the loads which would otherwise be imposed thereon. In other words, the pinion 42 does not rotate relative to the sun gear 41 or ring gear 43. Thereby, service life of the respective gears is prolonged.

If during two wheel drive operation a change to four wheel drive is desired, a hydraulic control valve for the servo motor of the transfer mechanism is actuated by a lever or switch which is provided in the vicinity of the driver's seat, gradually supplying the line pressure to the servo motor 80 to engage the clutch 8 smoothly, thereby coupling the output shaft 11 and sleeve 9 with each other. As a result, in addition to driving the rear drive output shaft 11, the power is transmitted simultaneously from the input shaft 2 to the front wheels through the linkage mechanism 14, output shaft 17 and front propeller shaft B to effect four wheel drive at a reduction ratio of 1. Again, the pinion 42 does not rotate relative to the sun gear 41 or ring gear 43.

When a greater output torque becomes necessary during four wheel drive operation, for example, for climbing a steep slope, the hydraulic control valve is operated to supply line pressure gradually to the hydraulic servo motor 50 and at the same time to drain the hydraulic servo motor 70 with suitable timing, thereby gradually engaging the brake 5 while smoothly releasing the clutch 7. As a result, the sun gear 41 and carrier 44 are unlocked from each other and the ring gear 43 is fixed to the transfer casing 18. Thus, power is transmitted from the input shaft 2 to output shafts 11 and 17 after speed reduction through the sun gear 41, pinion 42 and carrier 44 to provide four wheel drive of a larger torque.

Table 1 indicates the engaged and released states of the brake 5 and clutches 7 and 8 in different modes of operation as provided by the transfer device and control system of the invention.

TABLE 1

| Friction Element | 5 | 7 | 8 | Reduction Ratio |
|---|---|---|---|---|
| Two wheel drive | X | O | X | 1 |
| Four wheel drive (direct coupling) | X | O | O | 1 |
| Four wheel drive (at reduced speed) | O | X | O | $\frac{1+\lambda}{\lambda} = 3.0$ |

In Table 1, the symbols "O" and "X" denote the engaged and released states respectively of the friction element concerned, and the symbol "λ" represents a ratio of the number of teeth of the sun gear 41 to the ring gear 43. The reduction ratio given in the table is for the case where λ=0.5, as an example.

As stated in the foregoing description, the transfer device of the invention, which employs a planetary gear set and wet type friction elements operated by hydraulic servo motors, is capable of applying and releasing the respective friction elements smoothly with accurate timing. Thus, switching between two wheel drive and four wheel drive is accomplished, as well as a speed change by the transfer mechanism itself while the vehicle is traveling.

Futher, according to the present invention, the power of the input shaft of the transfer mechanism is delivered directly to an output shaft or shafts during the normal direct-coupling two or four wheel drive operations. This is done without transmitting power through the planetary gear set, relieving the gear set of unnecessary loads as described hereinabove.

Furthermore, the carrier of the planetary gear set is connected to one output shaft and to a cylinder of a hydraulic servo motor which is located on the side of the automatic transmission for releasably coupling the carrier with the sun gear. Accordingly, it is possible to provide a parking gear at an end portion of the transfer mechanism, (FIG. 1) contiguous to the automatic transmission. This requires only small modifications to the conventional parking mechanism of the automatic transmission instead of provision of a parking mechanism of a completely new design.

Figure 3:
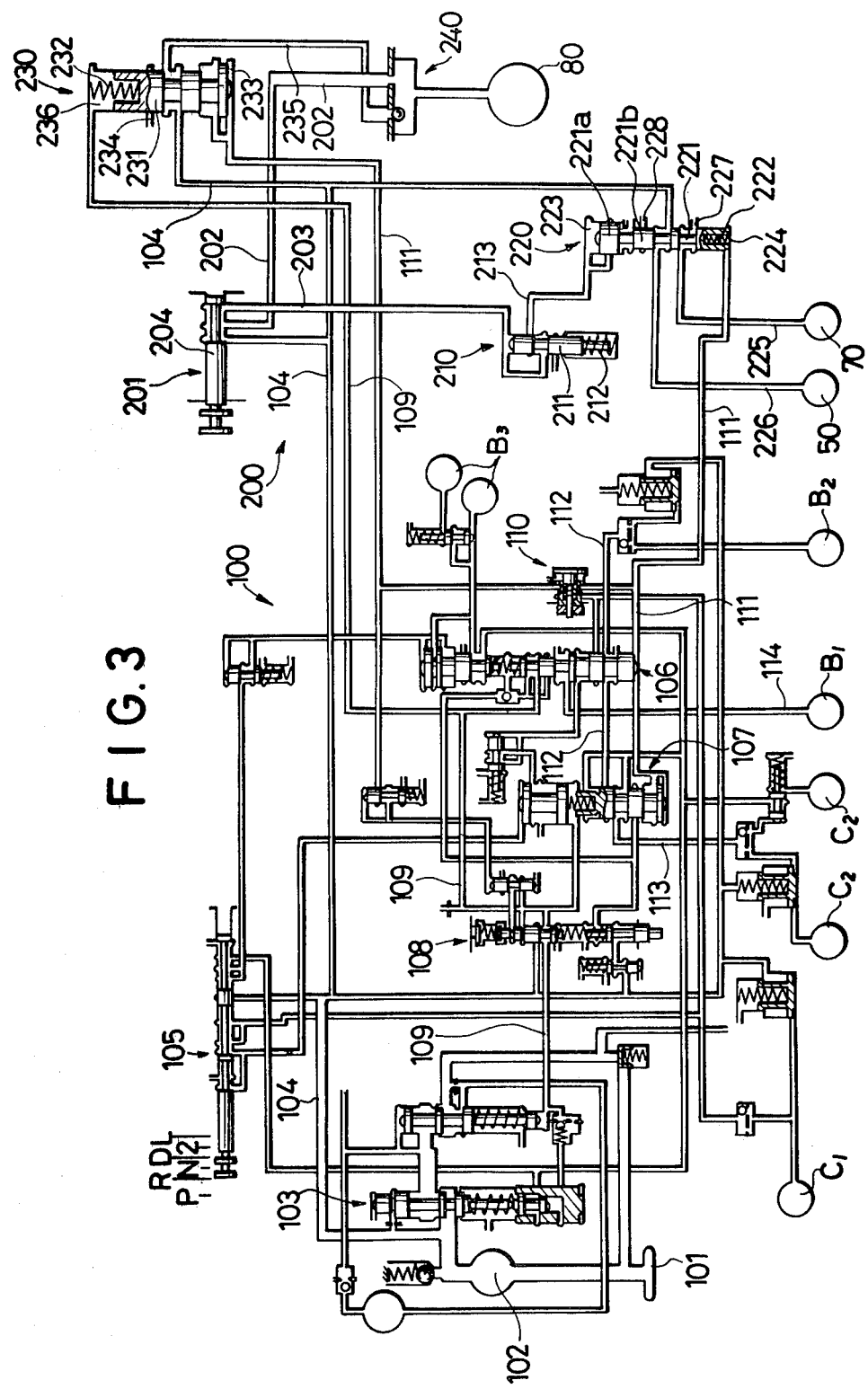
FIG. 3 is a schematic drawing of a hydraulic control system for the torque transfer mechanism of FIG. 1.

Referring now to FIG. 3, there is shown a hydraulic control system 100 for the four wheel drive torque transfer mechanism in accordance with this invention as applied to a vehicle having an automatic transmission of three forward and one reverse speeds.

In the system, oil taken from an oil sump 101 by an oil pump 102 is regulated to a predetermined pressure (line pressure) at the pump output by a regulator valve 103 and delivered to a conduit 104. The pressure inputted to the conduit 104 is fed to a 1-2 shift valve 106 through a manual selector valve 105.

A throttle valve 108 generates a pressure (throttle pressure) in a conduit 109 commensurate with the degree of throttle opening.

A governor valve 110 generates a pressure (governor pressure) in a conduit 111 commensurate with the vehicle speed.

The 1-2 shift valve 106 and 2-3 shift valve 107 open and close the conduits 112 to 114 according to the throttle and governor pressures supplied through conduits 109 and 111, thereby controlling the pressure supply to and drainage of hydraulic servo motors C1, C2, B1, B2 and B3 of clutches and brakes.

In this particular embodiment, the pressure is supplied to servo motor C1 in forward 1st speed, to servo motors C1 and B2 in forward 2nd speed, to servo motors C1, C2 and B2 in forward 3rd speed, and to servo motors C2 and B3 in reverse state.

The four wheel drive torque transfer mechanism is operated by a hydraulic control circuit 200 which includes a speed selector valve 201, a modulator valve 210 an inhibitor valve 220, and a change-over valve 230.

The speed selector valve 201 is operated by a shift lever at the driver's seat to control the communication of conduit 104 with conduits 202 and 203. In two wheel drive, conduit 104 is blocked by a spool 204 of the speed selector valve 201. In direct-coupling four wheel drive, conduit 104 is connected with conduit 202. In four wheel drive at a reduced speed, conduit 104 is connected with conduits 202 and 203.

The modulator valve 210, which is provided with a spool 211 and a spring 212, regulates the pressure in conduit 203 to produce a modulator pressure in conduit 213.

The inhibitor valve 220, which includes a spool 221, a spring 222 and oil chambers 223, 224 switches the connection of conduit 104 to either conduit 225 or 226 in accordance with the modulator pressure acting in the oil chamber 223 against the governor pressure acting in the oil chamber 224 through conduit 111 and against the force of the spring 222.

The change-over valve 230 includes a spool 231, a spring 232, oil chambers 233, 236 and a drain port 234, and controls the connection between the conduits 104, 235 in accordance with the pressure level prevailing in the oil chamber 233.

When the governor pressure in the conduit 111 is less then a predetermined value, the spool 231 is held in the lower position by the force of the spring 232 prevailing against the governor pressure in the oil chamber 233. The lower spool position (FIG. 3) connects the conduits 104, 235, thereby pressurizing the servo motor 80 and engaging the clutch 8. When the governor pressure is conduit 111 is greater than the predetermined value, the spool 231 is pushed upwards by the pressure prevailing in the oil chamber 233 which overcomes the opposing force of the spring 232, to connect the conduit 235 with a drain port 234, thereby the servo motor 80 is drained; the clutch 8 is released.

Further, the oil chamber 236 is connected with the conduit 109 in which the throttle pressure is present.

2-WHEEL DRIVE POSITION OF THE SELECTOR VALVE 201

In the two wheel drive mode of operation, conduit 104 is not in communication with the conduits 202, 203. Because no pressure is input to the oil chamber 223 of the inhibitor valve 220, the spool 221 is held in the upper position by the spring 222 which connects the conduit 104 with the conduit 225. The line pressure in conduit 104 is supplied to the hydraulic servo motor 70 of the clutch 7 through conduit 225 to engage the clutch 7 with results as described above.

When the vehicle speed is below a selected value, such as just after starting the vehicle, the spool 231 of the change-over valve 230 is held in the lower position by the force of the spring 232, which lower spool position connects the conduits 104 and 235.

The line pressure in the conduit 104 is supplied to the hydraulic servo motor 80 of the clutch 8 through conduit 235 and check valve 240 to smoothly engage the clutch 8 to establish 4-wheel drive.

When the vehicle speed exceeds the selected value, the spool 231 of the change-over value 230 is shifted to the upper position by the governor pressure in the conduit 111 acting in the oil chamber 233 to close off the conduit 104 while connecting the conduit 235 with the drain port 234. The pressure in the servo motor 80 of the clutch 8 is thus drained through the drain port 234 to release the clutch 8 and establish 2-wheel drive.

In the two wheel drive mode of operation, the clutch 8 is engaged and the four wheel drive is automatically established when the vehicle speed falls under a selected value. On the other hand, the clutch 8 is released to establish two wheel drive automatically when the vehicle speed exceeds the selected value. Thus, there is automatic shifting in response to governor pressure which is related to output shaft speed and vehicle speed.

It will be noted that when the throttle pressure, supplied in the oil chamber 236 through the conduit 109, becomes greater than the governor pressure acting by way of the conduit 111 in the oil chamber 233 while the torque transfer mechanism is in two wheel drive operation, the spool 231 is held in the lower position to establish four wheel drive operation which provides greater output torque.

DIRECT-COUPLING 4-WHEEL DRIVE POSITION OF THE SELECTOR VALVE 201

In direct-coupling four wheel drive operation, conduit 104 is in communication with the conduit 202. Similar to the two wheel drive operation, the line pressure in conduit 104 is supplied to the hydraulic servo motor 70 to the engage the clutch 7. At the same time, the line pressure fed to the conduit 202 is supplied to the servo motor 80 to engage the clutch 8 through a check valve 240.

4-WHEEL DRIVE AT REDUCED SPEED POSITION OF THE SELECTOR VALVE 201

In reduced speed four wheel drive operation, conduit 104 is in communication with conduits 202 and 203. The line pressure fed to conduit 203 is regulated by the modulator valve 210 to generate a modulator pressure in conduit 213.

When the governor pressure which is fed to the oil chamber 224 of the inhibitor valve 220 from the conduit 111 is greater than a predetermined value A, the spool 221 is held in the upper position against the modulator pressure acting in the oil chamber 223 through conduit 213, maintaining the direct-coupling four wheel drive condition. If the vehicle speed is lowered and the governor pressure drops below the predetermined value A, the spool 221 is moved downward by the modulator pressure acting in the oil chamber 223 to connect the conduit 104 with conduit 226 while connecting conduit 225 with a drain port 227. The pressure in the servo motor 70 of the clutch 7 is thus drained through the drain port 227 to release the clutch 7. At the same time, the line pressure in conduit 104 is fed to the servo motor 50 of the brake 5 through the conduit 226, engaging the brake 5 to establish the reduced speed four wheel drive condition. If the governor pressure becomes greater than a predetermined value B, where B exceeds A, due to an increase of vehicle speed during four wheel drive operation at reduced speed, the governor pressure overcomes the modulator pressure. This imbalance displaces the spool 221 upward, blocking the connection between conduits 104 and 226 while connecting conduit 226 with a drain port 228 and connecting conduit 104 with conduit 225. The pressurized fluid in the hydraulic servo motor 50 is thus drained through the conduit 226 and the drain port 228 to release the brake 5. Also, line pressure is supplied to the servo motor 70 through the conduit 225 to engage the clutch 7, thereby establishing the direct-coupling four wheel drive condition.

The governor pressure A, which prevails at the time of switching the operation from direct-coupling four wheel drive to reduced speed four wheel drive, is less than the governor pressure B which exists when the operation is switched from reduced speed four wheel drive to direct-coupling four wheel drive, due to the differences in surface area between the lands 221a and 221b of the spool 221.

As is clear from the foregoing description, the present invention provides a hydraulic control system for a four wheel drive torque transfer mechanism, which is particularly suitable for application to vehicles having an automatic transmission.

Further, the switching operation from two wheel drive to four wheel drive is permitted when the throttle pressure acting on one end of the spool of the change-over valve exceeds the governor pressure acting on the other end of the spool.

In the embodiments described above, and in the related tables, three modes of operation have been described, namely, two-wheel drive, direct coupling four-wheel drive, and reduced speed four-wheel drive. It will be apparent from the figures and the specification that with the same mechanisms and hydraulic control systems, it is also possible in each embodiment to provide a reduced speed, two-wheel drive. Such a drive, in a manner similar to the reduced speed four-wheel drive, would be capable of automatic shifting between direct and reduced speed drives.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A torque transfer mechanism for a four wheel drive vehicle having an automatic transmission, said torque transfer mechanism comprising:
    an input shaft for receiving torque from said automatic transmission;
    a first output shaft connected to one of front and rear drive axles of the vehicle;
    a second output shaft connected to the other one of the drive axles;
    means for transmitting the rotation of said first output shaft to said second output shaft;
    an engaging means for connecting and disconnecting said first output shaft to and from said second output shaft;
    a hydraulic control system including;
    a source of a first pressurized fluid;
    first conduit means for supplying, when connected, said first pressurized fluid to said engaging means;
    a valve means for selectively connecting said first conduit means with said engaging means;
    a source of a second pressurized fluid the pressure of said second pressurized fluid being commensurate with the vehicle speed;
    second conduit means for supplying said second pressurized fluid to said valve means, said second pressurized fluid operating with said valve means to connect said first conduit means with said engaging means when the pressure of said second pressurized fluid falls below a predetermined level and said second pressurized fluid operating with said valve means to disconnect said first conduit means from said engaging means when the pressure of said second pressurized fluid exceeds said predetermined level.

2. A torque transfer mechanism as claimed in claim 1, and further comprising drain means, said engaging means being drained of fluid when said second fluid pressure exceeds said predetermined level and said engaging means disengage, said drained fluid passing to said drain means.

3. A torque transfer mechanism as claimed in claim 1, wherein said means for transmitting the rotation of said first output shaft and said second output shaft includes a linkage mechanism.

4. A torque transfer mechanism as claimed in claim 3, wherein said engaging means include a first friction member connected to said first output shaft and a second friction member connected to said linkage mechanism.

5. A torque transfer mechanism as claimed in claim 1, wherein said fluids are pressurized in the hydraulic control system of said automatic transmission, and further comprising a governor, said second pressurized fluid having its pressure level determined by said governor of said torque transfer mechanism in response to the rotational speed of said first output shaft.

6. A torque transfer mechanism as claimed in claim 4, wherein said fluids are pressurized in the hydraulic control system of said automatic transmission, and further comprising a governor, said second pressurized fluid having its pressure level determined by said governor of said torque mechanism in response to the rotational speed of said first output shaft.

7. A torque transfer mechanism as claimed in claim 5, wherein said valve means includes a spring and a movable spool, the position of said spool selectively connecting said engaging means with said first pressurized fluid source or with said drain means, said second pressurized fluid and the force of said spring acting on opposite ends of said spool to determine the position of said spool.

8. A torque transfer mechanism as claimed in claim 6, wherein said valve means includes a spring and a movable spool, the position of said spool selectively connecting said engaging means with said first pressurized fluid source or with said drain means, said second pressurized fluid and the force of said spring acting on opposite ends of said spool to determine the position of said spool.

9. A torque transfer mechanism as claimed in claim 8, wherein said spool has lands and moves axially.

10. A torque transfer mechanism as claimed in claim 5, and further comprising a source of a third pressurized fluid, and conduit means for connecting said third fluid to said valve means, the pressure of said third fluid acting in opposition to the pressure of said second pressurized fluid, the pressure level of said third fluid being controlled at least in part externally of said torque transfer mechanism, whereby, by external action, said first conduit means may be connected to said engaging means when said second fluid pressure exceeds said predetermined level.

11. A torque transfer mechanism as claimed in claim 6, and further comprising a source of a third pressurized fluid, and conduit means for connecting said third fluid to said valve means, the pressure of said third fluid acting in opposition to the pressure of said second pressurized fluid, the pressure level of said third fluid being controlled at least in part externally of said torque transfer mechanism, whereby, by external action, said first conduit means may be connected to said engaging means when said second fluid pressure exceeds said predetermined level.

* * * * *